UNITED STATES PATENT OFFICE.

STEPHEN A. TISDALE, OF LEOMINSTER, MASSACHUSETTS.

PROCESS OF TREATING CATTLE-HOOFS.

No. 839,437. Specification of Letters Patent. Patented Dec. 25, 1906.

Application filed February 16, 1906. Serial No. 301,402.

*To all whom it may concern:*

Be it known that I, STEPHEN A. TISDALE, a citizen of the United States, and a resident of Leominster, in the county of Worcester and State of Massachusetts, have invented an Improvement in Processes of Treating Cattle-Hoofs, of which the following description is a specification.

This invention has for its object the production of a very simple, expeditious, and effective process for the treatment of cattle-hoofs to render the same commercially valuable.

Large quantities of buttons, hair-pins, combs, &c., are made from pressed horn and hoof, the latter being largely used in the effort to eliminate waste portions of the animal and also to increase the material available for the manufacture of such articles. In order to utilize the hoof, the sole and upper must be separated and the parts pressed into sheet form, and the process now in vogue is long, wasteful, and very disagreeable. When in its natural state the horn-like laminated structure of which the hoof is composed cannot be cut with a knife, and in order to prepare the hoofs for the cutting operation they are dumped in quantity into large vats or tanks filled with water, where they remain for from three days to a week. At the end of this period the soaking has very materially softened the hoof; but to insure easy cutting the hoofs are then placed in a tank of boiling water, from which the boiled hoofs are removed by the workman. His first act is to cut off with a sharp knife the heel and an irregular piece extending around the top of the upper, relegating these pieces to the scrap heap, and then he cuts apart the sole and upper. Such separated parts are then ready to be pressed into sheet form, from which various useful articles are fashioned. This method is long, consuming from four days to a week, or even longer. It is most disagreeable, owing to the stench arising as the result of the soaking and boiling, and it is wasteful and destructive of the material. The heel and top of the upper must be removed, because the soaking and boiling have decayed such parts, so that a material portion of each hoof is wasted.

Normally the laminated hoof structure is highly elastic; but the softening steps—viz, soaking and boiling—deaden and render lifeless the hoof, so that the sheets into which it is pressed and the articles made from such sheets are very brittle and break readily both in the course of manufacture and afterward. The value of the pressed hoof is in consequence very much less than that of genuine horn, and the waste due to breakage in manufacturing articles from the pressed hoof is large enough to be most undesirable.

I have discovered a simple and rapid process for the treatment of hoofs whereby the time involved is reduced to a few minutes, all disagreeable odor is eliminated, waste done away with, and the original elasticity and "life" of the hoof material preserved.

In accordance with my novel process the hoofs are cleaned when necessary by tumbling and sometimes by rapid scrubbing to remove the dirt, and the hoofs are then softened by immersion in hot oil for a few minutes, after which the operator with a sharp knife separates the sole and upper. The separated parts are then pressed into sheets ready for use.

The immersion in oil is for the purpose of softening the hoof sufficiently to enable it to be readily cut with a sharp knife, and I have found that a temperature of from about 225° to 250° Fahrenheit is suitable for the purpose. From about five to eight minutes immersion is the time required; but by making the oil-bath somewhat hotter the time can be reduced, and by increasing the time of immersion the temperature of the bath may be less. I have found, however, that the temperature above specified for the bath and the time stated give highly satisfactory and practical results.

I have used with success animal, vegetable, and mineral oils, so that the particular character of the oil does not appear to be essential.

The whole purpose of the oil-bath is to soften the hoof material for cutting, and the oil has no deleterious effect upon the hoof, either by way of decay or in reducing its natural elasticity, for I find that hoofs treated by my process furnish material from which useful articles can be made possessing practically as much elasticity and flexibility as if they were made of genuine horn.

The pressed hoof resulting from my process sells for very nearly the same price as genuine horn and is almost equal to it in strength and elasticity.

There is no waste part of the hoof in my process, and as there is a great reduction in the waste, due to breakage in manufacturing articles from the pressed hoof, the item of waste is very much diminished.

It will be manifest to those skilled in the treatment of hoofs that fresh hoofs will respond more promptly to the softening action of the oil-bath than with old and very dry hoofs, so that in the latter instance it may occasionally be necessary to extend the immersion for a minute or two. As a general rule, however, it will be found that substantially the time of immersion and the temperature of the oil-bath will be substantially as hereinbefore set forth.

Having described my invention, what I claim as new, and desire to secure by Letters Patent, is—

1. The herein-described process of treating cattle-hoofs, which consists in immersing the hoof in oil at a temperature of from 225° to 250° Fahrenheit to soften its structure; separating the sole from the upper by a knife cut; and thereafter forming the separated parts into sheets by pressure.

2. The herein-described process of treating cattle-hoofs, which consists in softening the hoof by immersion for from about five to eight minutes in a bath of oil at a temperature of from 225° to 250° Fahrenheit, cutting the sole from the upper, and finally pressing the separated parts into sheet form.

3. The herein-described process of treating cattle-hoofs, which consists in softening the hoof by immersion for a few minutes in an oil-bath at a temperature of about 225° Fahrenheit, severing the sole from the upper adjacent the base of the latter, and finally pressing the separated parts into sheets.

In testimony whereof I have signed my name to this specification in the presence of two subscribing witnesses.

STEPHEN A. TISDALE.

Witnesses:
ALBERT A. TISDALE,
MABEL G. KIELY.